S. Kepner,

Gate.

No. 108,031.  Patented Oct. 4, 1870.

Witnesses.  Inventor.

United States Patent Office.

SOLOMON KEPNER, OF POTTSTOWN, PENNSYLVANIA.

Letters Patent No. 108,031, dated October 4, 1870.

IMPROVEMENT IN GATES.

The Schedule referred to in these Letters Patent and making part of the same.

*To all whom it may concern:*

Be it known that I, SOLOMON KEPNER, of Pottstown, in the county of Montgomery and in the State of Pennsylvania, have invented certain new and useful Improvements in Farm-Gates; and do hereby declare that the following is a full, clear, and exact description thereof, reference being had to the accompanying drawing making a part of this specification, in which—

Letters of like name and kind refer to like parts in each of the figures.

Figure 1:
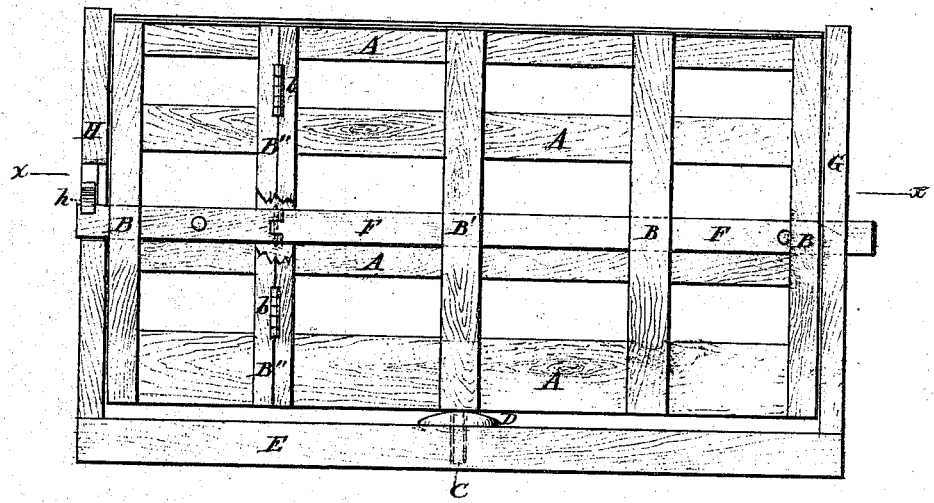
Figure 1 is a side elevation of my improved device.
Figure 2:
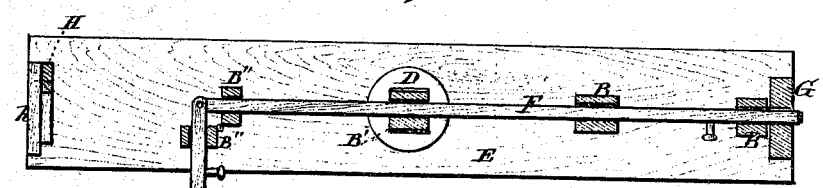
Figure 2 is a horizontal section of the same, on the line $x\,x$ of fig. 1, showing the hinged section open.
Figure 3:
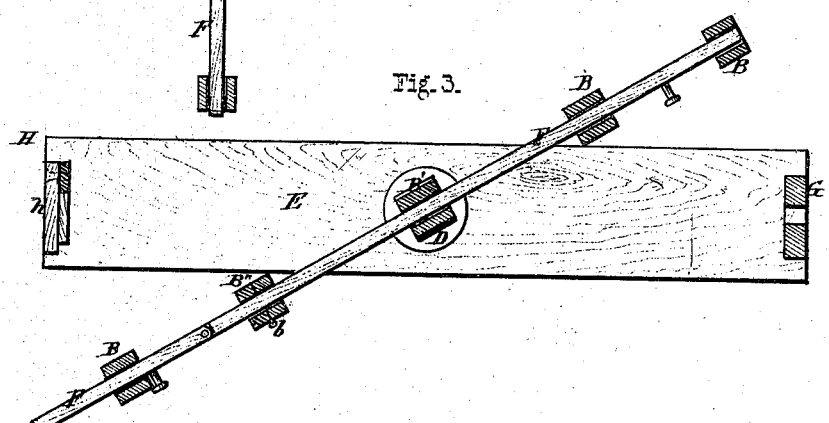
Figure 3 is a like view of the same, showing the entire gate, partly opened.

My invention has for its object the suspension of a gate, in such a manner as to not only obviate the necessity for ordinary side posts, but also to render said gate less liable to displacement by frost; and It consists, principally, in balancing a gate upon or by means of a pivot, extending downward, and fitting into a suitable socket imbedded within the ground, as is hereinafter shown.

It further consists in hinging a portion of said gate, substantially as and for the purpose hereinafter set forth.

It finally consists in the means employed for securing the gate to and in a line with the fence, as is hereinafter specified.

In the annexed drawing—

A and A represent a series of parallel bars, connected together in a horizontal position by means of a number of vertical strips, B, secured in pairs upon opposite sides of said bars.

Secured to and projecting vertically downward from the lower end of the center strips B', is a round bar, C, which fits into a corresponding opening within a stone, D, secured to or within a sill, E, or imbedded within the ground, and furnishes an axial pivot for and upon which the gate may be rotated horizontally, so as to enable it to be placed at a right angle to the line of the fence, and provide an opening or passage between said fence and gate, upon either side of the latter.

When in position in a line with the fence, the gate is secured in place by means of a bar, F, which rests upon the second bar A, between the strips B, with one of its projecting ends within a suitable slot provided in and through a post, G, and its opposite end engaging with a catch, $h$, pivoted within a notch in the face of a second post, H.

In order to open the gate when thus secured, the bar F is pushed endwise, so as to release its end from engagement with the post G, after which the catch $h$ is raised, releasing said gate, which may then be swung open.

For use in places where both a large and a small gate are required, I divide the gate vertically through the center of the strips B'', and connect the parts together by means of hinges, $b$, so as to enable the small section to be opened without disturbing the balance of the gate. The locking-bar F is also divided, and suitably hinged at the line of division between the large and small gates, so as to present no obstacle to the free, independent movement of the latter.

As thus constructed, this gate possesses many advantages, among which are—

First, being entirely independent of the posts and fence, the vertical displacement of either, by the action of frost or water, will not, in the slightest degree, affect the free action of the gate.

Second, being balanced upon as well as supported by the axial pin, the gate is subjected to none of the wrenching strain common to those suspended in the usual manner; in addition to which, so little power is required to move said gate, that the strength exerted by a small child will be sufficient for its operation.

Third, being constructed of comparatively inexpensive material, and possessing great simplicity and durability of parts, the gate can be furnished and maintained in repair at a cost much below that of any gate now in use, that is equally efficient.

Fourth, the gate may be readily raised until its axial pivot is withdrawn from its socket, and then removed to one side, so as to afford passage between the posts, for the loaded wagons requiring more than ordinary space, after which said gate may be readily returned to position.

Having thus fully set forth the nature and merits of my invention,

What I claim as new is—

1. A farm-gate, sustained by and balanced upon a single pivot, extending downward from and fitting into a suitable socket, substantially as shown and described.

2. In combination with the folding, balanced gate, above described, the means employed for securing the gate to and in line with the fence, consisting of the sliding jointed bar F, engaging with a suitable slot within the post G, and with the catch $h$, pivoted to or upon the post H, substantially as shown and specified.

In testimony that I claim the foregoing, I have hereunto set my hand and seal this 3d day of June, 1870.

SOLOMON KEPNER. [L. S.]

Witnesses:
JNO. S. WEILER,
L. H. DAVIS.